(12) United States Patent
Hofer et al.

(10) Patent No.: US 10,868,286 B2
(45) Date of Patent: Dec. 15, 2020

(54) FIXING BATTERY CELLS IN PLACE BY COMPRESSED CELL FIXTURE

(71) Applicant: Lisa Dräxlmaier GmbH, Vilsbiburg (DE)

(72) Inventors: Guido Hofer, Weng (DE); Peter Faltermeier, Landshut (DE)

(73) Assignee: Lisa Draexlmaier GMBH, Vilsbiburg (DE)

( * ) Notice: Subject to any disclaimer, the term of this patent is extended or adjusted under 35 U.S.C. 154(b) by 0 days.

(21) Appl. No.: 14/625,516

(22) Filed: Feb. 18, 2015

(65) Prior Publication Data
US 2015/0236315 A1 Aug. 20, 2015

(30) Foreign Application Priority Data
Feb. 19, 2014 (DE) .......................... 10 2014 002 165

(51) Int. Cl.
| | | |
|---|---|---|
| *H01M 2/10* | (2006.01) | |
| *H01M 10/0525* | (2010.01) | |
| *H01M 2/02* | (2006.01) | |

(52) U.S. Cl.
CPC ..... *H01M 2/1077* (2013.01); *H01M 10/0525* (2013.01); *H01M 2/022* (2013.01); *H01M 2220/20* (2013.01); *Y10T 29/4911* (2015.01)

(58) Field of Classification Search
CPC .......... H01M 2/1077; H01M 10/0525; H01M 2/022; H01M 2220/20; Y10T 9/4911; Y02E 60/10
See application file for complete search history.

(56) References Cited

U.S. PATENT DOCUMENTS

| | | | |
|---|---|---|---|
| 8,603,660 B2 * | 12/2013 | Houchin-Miller | ............................ H01M 2/1077 429/120 |
| 2005/0174092 A1 * | 8/2005 | Dougherty | .......... H01M 2/1077 320/128 |
| 2008/0314792 A1 | 12/2008 | Daeschler et al. | |
| 2009/0297892 A1 * | 12/2009 | Ijaz | ....................... H01M 2/105 429/7 |
| 2010/0136402 A1 * | 6/2010 | Hermann | ............ H01M 2/1077 429/120 |

(Continued)

FOREIGN PATENT DOCUMENTS

| | | |
|---|---|---|
| CN | 101330134 A | 12/2008 |
| CN | 2012323212 Y | 10/2009 |

(Continued)

OTHER PUBLICATIONS

Machine Translation of Schulz et al. DE102007010742, Published Aug. 2008, obtained form Espacenet.com.*

(Continued)

*Primary Examiner* — Michael L Dignan
(74) *Attorney, Agent, or Firm* — Jacob Eisenberg

(57) ABSTRACT

A method for fixing battery cells includes positioning each battery cell in a respective opening of a cell fixture; inserting a first side of each battery cell into a respective opening of a first cell carrier; inserting a second side, opposite to the first side, of each battery cell into a respective opening of a second cell carrier, such that the cell fixture is positioned between the first and second cell carriers; and pressing the first and second cell carriers together to compress the cell fixture.

20 Claims, 1 Drawing Sheet

(56) References Cited

U.S. PATENT DOCUMENTS

| | | | | |
|---|---|---|---|---|
| 2010/0248029 | A1* | 9/2010 | Butt | H01M 2/1077 |
| | | | | 429/211 |
| 2010/0285346 | A1* | 11/2010 | Graban | H01M 2/1077 |
| | | | | 429/120 |
| 2011/0052957 | A1 | 3/2011 | Ohta | |
| 2011/0135975 | A1 | 6/2011 | Fuhr et al. | |
| 2012/0003508 | A1* | 1/2012 | Narbonne | H01M 10/653 |
| | | | | 429/8 |
| 2012/0225331 | A1* | 9/2012 | Tartaglia | H01M 2/0267 |
| | | | | 429/50 |
| 2013/0171492 | A1* | 7/2013 | Shih | H01M 10/6551 |
| | | | | 429/120 |
| 2014/0154541 | A1* | 6/2014 | Asakura | H01M 2/023 |
| | | | | 429/82 |
| 2014/0178723 | A1 | 6/2014 | Tsujioka et al. | |
| 2015/0064514 | A1* | 3/2015 | Wu | H01M 2/1241 |
| | | | | 429/56 |
| 2016/0141571 | A1* | 5/2016 | Adachi | H01M 10/655 |
| | | | | 320/113 |

FOREIGN PATENT DOCUMENTS

| | | | | |
|---|---|---|---|---|
| CN | 101803064 | A | 8/2010 | |
| CN | 201741734 | U | 2/2011 | |
| CN | 102165625 | A | 8/2011 | |
| CN | 102844907 | A | 12/2012 | |
| DE | 102007010742 | A1 * | 8/2008 | B60L 11/1874 |
| DE | 102007010748 | A1 | 8/2008 | |
| EP | 2 320 492 | A1 | 5/2011 | |
| JP | 2004-171856 | * | 6/2004 | H01M 2/20 |
| JP | 2004171856 | A | 6/2004 | |
| JP | 2012-234699 | A | 11/2012 | |
| JP | WO 2013021573 | A1 | 3/2015 | |
| WO | WO 2008/104376 | A1 | 9/2008 | |

OTHER PUBLICATIONS

Hayashi et al., JP 2012-234699 A machine translation (Year: 2012).*
Machine English translation of JP 2004-171856 (Year: 2004).*
Machine English translation of JP 2012-234699 (Year: 2012).*
Machine English translation of CN 2013-23212 (Year: 2013).*
First Office Action dated Sep. 2, 2016, issued by the State Intellectual Property Office of the People's Republic of China, in Application No. 20150080768.9 (13 pages with English translation).
Office Action dated May 31, 2017, issued by the State Intellectual Property Office of the People's Republic of China, in Application No. 201510080768.9.

\* cited by examiner

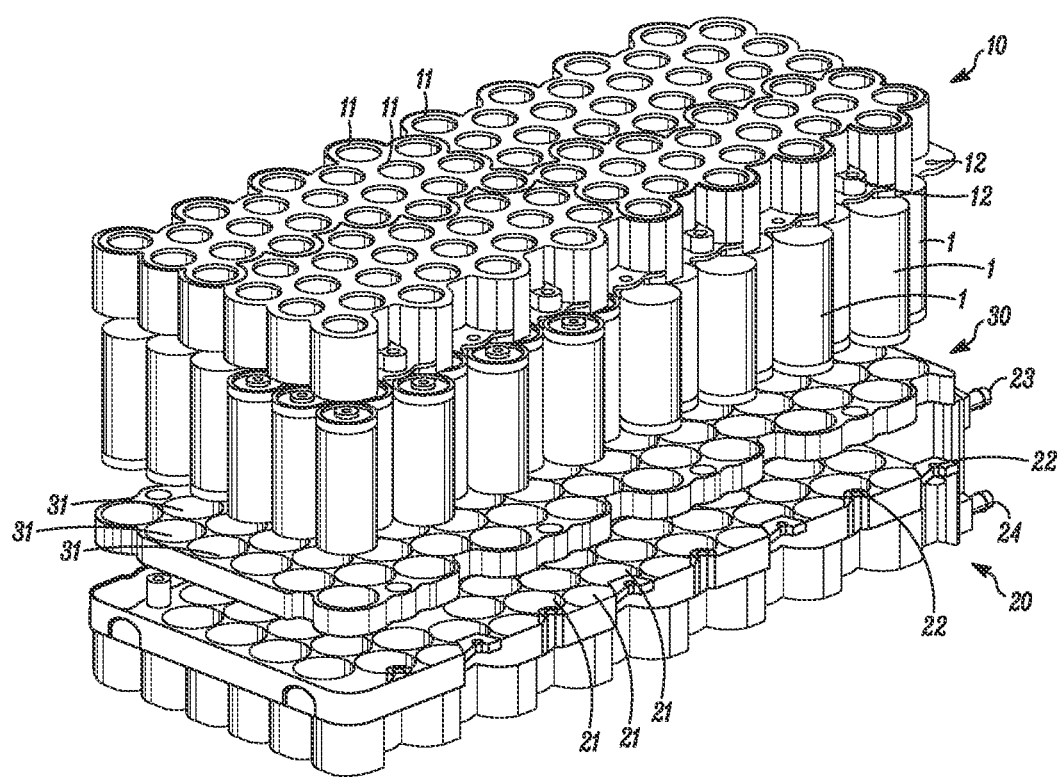

FIXING BATTERY CELLS IN PLACE BY COMPRESSED CELL FIXTURE

CROSS-REFERENCE TO RELATED APPLICATION

This application is based upon and claims the benefit of prior German Application No. 10 2014 002 165.3, filed on Feb. 19, 2014, the entire contents of which are incorporated herein by reference.

TECHNICAL HELD

The disclosure relates to a method for fixing battery cells in place to create a cell block, as well as a cell block with a plurality of battery cells.

BACKGROUND OF THE INVENTION

High-voltage batteries have been used in motor vehicle applications, in particular in motor vehicles with hybrid drive or an all-electrical drive. Usually, such batteries have multiple battery cells, for example lithium ion cells, which are bundled as a cell block. In the present disclosure, unless otherwise specified, a "cell" refers to a battery cell.

In a battery, individual cells, which may be developed as round cells, need to be fixed in place in such a fashion as to minimize vibrations, avoid rattling noises, and prolong a service life of cell contacts. For example, if sheet metal strips are soldered to the cells for contacting, the strips may experience fatigue due to vibration, and eventually break. This problem is intensified in that the dimensions of the cells are subject to tolerances, which complicates fixing all cells dependably in place with optimally simple mechanical means.

DE 10 2007 010 748 A1 describes a battery with a cell block. The cell block has a box-shaped housing that includes a floor and a side wall, into which cells are inserted. The entire cell block is enclosed by a sheet metal casing and grouted with thermally conductive grouting. The grouting simultaneously assumes the electrical insulation and fixes the cells in place in the cell composite.

SUMMARY

One object of the disclosure is to provide an improved method for fixing cells in place, and a cell block based thereon.

Consistent with the disclosure, cells are fixed in place to form a cell block. One or a plurality of cell blocks can be further processed to form a complete battery. In some embodiments, the cells have elongated bodies, such as cylindrical round cells. In some embodiments, the cells have a uniform geometry.

The cell block includes a first cell carrier and a second cell carrier, which hold the cells at opposite sides in a sandwich-like fashion. In some embodiments, the cells are inserted from one side into openings of the first cell carrier, and from an opposite side into openings of the second cell carrier. In the case of round cells, the cell carriers have round openings, which correspond to the diameters of the cells. Therefore, the cells are held from the top and from the bottom by means of the cell carriers. Furthermore, the cells run through openings of a cell fixture such that each opening of the cell fixture accommodates a center portion of one of the cells. The cell fixture is located between the two cell carriers.

To fix the cells in place permanently, the cell fixture is then compressed by means of the two cell carriers by pressing the cell carriers together. If the direction of compression is the Z-direction, which, in the case of elongated cells, is their main direction of extension, the material of the cell fixture expands along spatial directions X and Y, which are perpendicular to the Z direction. Therefore, the material of the cell fixture may enclose every single cell evenly and firmly, regardless of any tolerances. The cells are fixed in place with simple means. Individual clamping, adapting, etc., of the cells is not necessary. As a result, vibrations and rattling noises when the battery is in use, such as with motor vehicle applications, are reduced. This increases a service life of the cell block and therefore the battery. In addition, the fixture shown here can be easily adapted to varying cell geometries and cell arrangements. Tolerances are compensated automatically and with simple means. Since the fixturecells are fixed in place with decidedly few individual parts, an expensive construction is avoided. Furthermore, the cell fixture as such does not have to be overly precise because the adaptation to the cells occurs through the compression. Therefore, an extreme precision adaptation at the tool, such as the injection-molding tool, for example, is not needed when making the cell fixture. The cells are not subject to uneven or excessive pressing forces. Furthermore, the cell block can be simply disassembled after it has exceeded its service life, the cell fixture can be removed and disposed of by variety, which is quite difficult when injection-molding a grouting material according to the conventional technology.

In some embodiments, the cell fixture includes a foam, such as a foam mat, for example. The foam is elastic, easy to produce, and easy to deform in terms of the application. Such a foam may be a polyurethane foam, for example.

In some embodiments, the two cell carriers as well as the cell fixture are of non-conductive materials and the cell fixture includes a material that can be compressed and is elastic, but is at least softer than the cell carrier.

In some embodiments, the cell fixture is compressed by means of a device that presses the two cell carriers together. After the two cell carriers are pressed together, they are attached to one another by, for example, screwing, soldering, riveting, gluing, or clipping. In this scenario, the device for pressing the cell fixture together is not part of the finished cell block and also not part of the battery to be produced therewith.

In some embodiments, the cell fixture can be compressed by means of a device that simultaneously attaches the cell carriers to one another after the compressing. Such a device may become a part of the cell block and/or the battery. In this scenario, a subsequent screwing, clipping, or other fastening of the cell carriers may not be necessary.

In some embodiments, the cell fixture is first placed into the second cell carrier. Then the cells are inserted into the openings of the second cell carrier and the cell fixture. Then the first cell carrier is placed on the cells from the opposite side, with the cells being inserted into the openings of the first cell carrier. Then the two cell carriers are pressed together, which leads to a compressing of the cell fixture. Finally, the two cell carriers are screwed together.

The cell fixture discussed above is suitable for use in a motor vehicle, such as a hybrid motor vehicle or an electrical motor vehicle. Nevertheless, devices and methods consistent with the disclosure can also be implemented in other fields such as the transportation field in general, such as in aviation, shipping and rail traffic, in building services, the electrical industry, such as in entertainment electronics, construction technology, etc. Furthermore, additional advantages and features of the disclosure are described below in the description of embodiments. The characteristics described there can be implemented alone or in combination with one or a plurality of characteristics mentioned above, as long as the characteristics are not contradictive. The following description of the embodiments makes reference to the accompanying drawing.

BRIEF DESCRIPTION OF THE DRAWING

FIG. 1 shows a cell block according to an exemplary embodiment.

DESCRIPTION OF THE EMBODIMENTS

FIG. 1 is a perspective view of a cell block consistent with embodiments of the disclosure, in a drawn out manner to show individual components of the cell block.

Here, reference symbol 10 refers to an upper cell carrier, which may also be referred to as a first cell carrier. Reference symbol 20 refers to a lower cell carrier, which may also be referred to as a second cell carrier. Reference symbol 30 refers to a cell fixture.

The upper cell carrier 10, the lower cell carrier 20, and the cell fixture 30 each have openings 11, 21, and 31, respectively, through which and/or into which cells 1 are inserted. Whereas the cells 1 can be inserted through the openings 31, the openings 11 and 21 of the two cell carriers 10 and 20 are closed at one side or provided with a reduced radius so that the cells 1 are held by the cell carriers 10 and 20 and would not slide through the openings 11 and 21.

In some embodiments, the two cell carriers 10 and 20 are made of a synthetic material, such as polyimide, for example. In some embodiments, the cell fixture 30 is made of a foam, such as polyurethane, for example. In some embodiments, the cell fixture 30 is present as a mat. Other materials are conceivable as well. Consistent with the disclosure, the two cell carriers 10 and 20 as well as the cell fixture 30 are made of non-conductive materials, and the cell fixture 30 is made of a compressible material that is, for example, elastic, but at least is softer than the material of the cell carriers 10 and 20.

As shown in FIG. 1, the lower cell carrier 20 is constructed in the shape of a bowl with respect to the cell fixture 30 so that the cell fixture 30 can be placed into the lower cell carrier 20. Then the cells 1 are inserted into the openings 31 of the cell fixture 30 and the openings 21 of the lower cell carrier 20. Then the upper cell carrier 10 is placed from the top onto the cells 1. The two cell carriers 10 and 20 are pressed together and finally screwed together. The cell carriers 10 and 20 include openings 12 and 22, respectively, and are screwed together by inserting screws through the openings 12 and 22.

As shown in FIG. 1, the lower carrier 20 includes terminals 23 and 24, through which an electrical connection can be established and/or a coolant can be supplied. The individual cells 1 are electrically coupled with one another after the cell block are compressed and screwed via the openings 11 of the upper cell carrier 10 and/or the openings 21 (and/or via their outputs, which are not shown) of the lower cell carrier 20.

What is claimed is:
1. A battery cell block, comprising:
a plurality of battery cells, each battery cell extending in a longitudinal direction;
a first cell carrier of non-conductive material having a first upper surface and a first lower surface, the first lower surface further comprising first openings extending in the longitudinal direction, wherein the first openings are configured to receive for insertion a first side, with respect to the longitudinal direction, of each battery cell and the first upper surface includes first ends opposite the first openings, each first end being closed;
a second cell carrier of non-conductive material having a second upper surface and a second lower surface, the second upper surface further comprising second openings extending in the longitudinal direction, wherein the second upper surface faces the first lower surface and the second openings are configured to receive for insertion a second side, with respect to the longitudinal direction, opposite to the first side, of each battery cell and the second lower surface includes second ends opposite the second openings, each second end being closed; and
a cell fixture located between the first lower surface and the second upper surface cell fixture being made of a compressible material and configured to be in a compressed state that is created when the first and second cell carriers are coupled together to compress the cell fixture on opposite sides of the cell fixture such that the compressible material expands to firmly enclose every single cell and to fix the cells in place, and the cell fixture having third openings, each of the third openings accommodating a center portion of one battery cell in the longitudinal direction.

2. The cell block according to claim 1, wherein the cell fixture includes a foam material that is compressed.

3. The cell block according to claim 1, wherein the cell fixture is made of polyurethane.

4. The cell block according to claim 1, wherein the first and second cell carriers are fastened to each other.

5. The cell block according to claim 4, wherein the first and second cell carriers are fastened to each other by screwing, soldering, riveting, gluing, or clipping.

6. The cell block according to claim 5, wherein the first and second cell carriers are fastened to each other by screws inserted in respective screw openings on the first and second cell carriers.

7. The cell block according to claim 1, wherein the first cell carrier and the second carrier both contact the cell fixture when the first and second cell carriers are coupled together.

8. The cell block according to claim 7, wherein the cell fixture comprises:
a first cell fixture end contacting the first lower surface of the first cell carrier; and a second cell fixture end contacting the second upper surface of the second cell carrier.

9. The cell block according to claim 1, wherein the second cell carrier comprises first and second terminals configured to enable an electrical connection.

10. The cell block according to claim 9, wherein the first and second terminals are configured to enable passage of a coolant to and from the cell block.

11. The cell block according to claim 1, wherein the second cell carrier comprises first and second terminals configured to enable passage of a coolant to and from the cell block.

12. The cell block according to claim 1, wherein the cell fixture expands in a plane orthogonal to the longitudinal direction when in the compressed state.

13. A battery cell block, comprising:
a plurality of battery cells, each battery cell extending in a longitudinal direction;
a first cell carrier of non-conductive material having a first upper surface and a first lower surface, the first lower surface further comprising first openings extending in the longitudinal direction, wherein the first openings are configured to receive for insertion a first side, with respect to the longitudinal direction, of each battery cell and the first upper surface includes first ends opposite the first openings, each first end having an opening with a radius smaller than the radius of the respective first opening;
a second cell carrier of non-conductive material having a second upper surface and a second lower surface, the second upper surface further comprising second openings extending in the longitudinal direction, wherein the second upper surface faces the first lower surface and the second openings are configured to receive for insertion a second side, with respect to the longitudinal direction, opposite to the first side, of each battery cell and the second lower surface includes second ends opposite the second openings, each second end having an opening with a radius smaller than the radius of the respective second opening; and
a cell fixture located between the first lower surface and the second upper surface cell fixture being made of a compressible material and configured to be in a compressed state that is created when the first and second cell carriers are coupled together to compress the cell fixture on opposite sides of the cell fixture such that the compressible material expands to firmly enclose every single cell and to fix the cells in place, and the cell fixture having third openings, each of the third openings accommodating a center portion of one battery cell in the longitudinal direction.

14. The cell block according to claim 13, wherein the cell fixture includes a foam material that is compressed.

15. The cell block according to claim 13, wherein the cell fixture is made of polyurethane.

16. The cell block according to claim 13, wherein the and second cell carriers are fastened to each other.

17. The cell block according to claim 13, wherein the battery cells do not extend past the first ends or the second ends in the longitudinal direction.

18. The cell block according to claim 13, wherein the first cell carrier and the second carrier both contact the cell fixture when the first and second cell carriers are coupled together.

19. The cell block according to claim 18, wherein the cell fixture comprises:
a first cell fixture end contacting the first lower surface of the first cell carrier; and a second cell fixture end contacting the second upper surface of the second cell carrier.

20. The cell block according to claim 13, wherein the second cell carrier comprises first and second terminals configured to enable an electrical connection and passage of a coolant to and from the cell block.

* * * * *